United States Patent [19]
Dola
[11] 4,051,383
[45] Sept. 27, 1977

[54] ELECTRICAL HARNESSES AND CONNECTING DEVICES THEREFOR

[75] Inventor: Frank Peter Dola, Port Richey, Fla.
[73] Assignee: AMP Incorporated, Harrisburg, Pa.

[21] Appl. No.: 671,786
[22] Filed: Mar. 30, 1976
[51] Int. Cl.[2] .................... H02G 3/00
[52] U.S. Cl. .................... 307/11; 307/10 LS; 307/147; 174/72 A; 339/176 MF
[58] Field of Search .................... 307/10 R, 10 LS, 11 147, 307/9; 174/72 A, 117 F, 117 FF; 339/176 MF

[56] References Cited

U.S. PATENT DOCUMENTS

| | | | |
|---|---|---|---|
| 3,697,767 | 10/1972 | Fioravanti | 307/10 R |
| 3,816,818 | 6/1974 | Meier | 339/176 MF |
| 3,860,316 | 1/1975 | Hardesty | 339/176 MF |

*Primary Examiner*—Robert K. Schaffer
*Assistant Examiner*—Morris Ginsburg
*Attorney, Agent, or Firm*—Frederick W. Raring; Robert W. Pitts; Jay L. Seitchik

[57] ABSTRACT

Electrical harness comprises a plurality of conductors to which switches and electrical loads are connected. The connections between the conductors and loads or switches are made with a connecting device comprising an insulating body having a recess which receives the conductors in side-by-side parallel relationship. A conductor to which a connection is made is electrically exposed and a contact arm mounted on the body extends across the recess and contacts the exposed conductor. The load or switch is connected to the contact arm by a plug on the end of a lead wire which is inserted into the body and which engages the contact arm when it is inserted.

14 Claims, 8 Drawing Figures

ELECTRICAL HARNESSES AND CONNECTING DEVICES THEREFOR

BACKGROUND OF THE INVENTION

This invention relates to electrical harnesses and to improved methods of manufacturing electrical harnesses. The invention is herein described as an embodiment intended for use in a motor vehicle but other uses of the invention will be apparent from the description which follows.

It is common practice to manufacture an electrical harness by lacing the wires for the harness around appropriately located pegs on a harness board, applying bundle ties to the wires, removing the laced wires from the harness board, stripping insulation from the ends of the wires, applying terminals to the wire ends and finally, inserting the terminals into connector housings. Alternatively, some harnesses are manufactured by manufacturing the individual leads having terminals on their ends in a lead making machine, storing the leads in bins, selecting one or more leads from each bin for the harness, and assemblying the harness from the individual leads. Both methods are relatively time consuming and are subject to errors on the part of the technician which must later be corrected. Furthermore, these harnesses making methods do not discourage the use of an unnecessarily high number of different types of connectors and terminals in the harness. It is not uncommon for a harness of the type used in an automobile or an electrical appliance to have several different styles or types of terminals and connectors on the harness when, in fact, one or two standard types could be used. This lack of standardization probably is a result of the fact that the apparatus on which the harness is used was designed by different groups of designers and each group of designers selected the terminals for the components of the apparatus for which the group has responsibility. Finally, the assembly process in which harnesses are assembled to the apparatus is somewhat unsatisfactory in that after the cables of the harness have been secured in place in the apparatus, the different types of connectors on the harness must be mated or coupled with complementary connectors extending from the components on the apparatus and the lack of standardization tends to complicate this process and lengthen the time required for carrying it out.

In accordance with the principles of the instant invention, the wires of the harness are simply bundled together, or they are provided as a flat cable and at every location at which an electrical connection is to be made to a wire in the harness, that wire is electrically exposed (e.g. the insulation is stripped from the wire). A standard connecting device is then clamped onto the wire, this connecting device having an insulating body member and a contact arm which engages the electrically exposed wire. The body also has an opening therein for an electrical plug which, when inserted, electrically contacts or engages the contact arm. The plug in turn is secured to a wire which extends from an electrical switch or load.

It is accordingly an object of the invention to provide an improved method of manufacturing electrical harnesses. A further object is to provide an improved connecting device intended for use on electrical harnesses. A further object is to provide a connecting device which can be used to make all, or virtually all, of the connections required in the harness to electrical loads or electrical switches. A further object is to provide a connecting device which can be readily inspected after application to a harness so that a determination can be made of the efficiency of the connection.

These and other objects of the invention are achieved in preferred embodiments thereof which are briefly described in the foregoing application, which are described in detail below and which are shown in the accompanying drawing in which.

Figure 1:
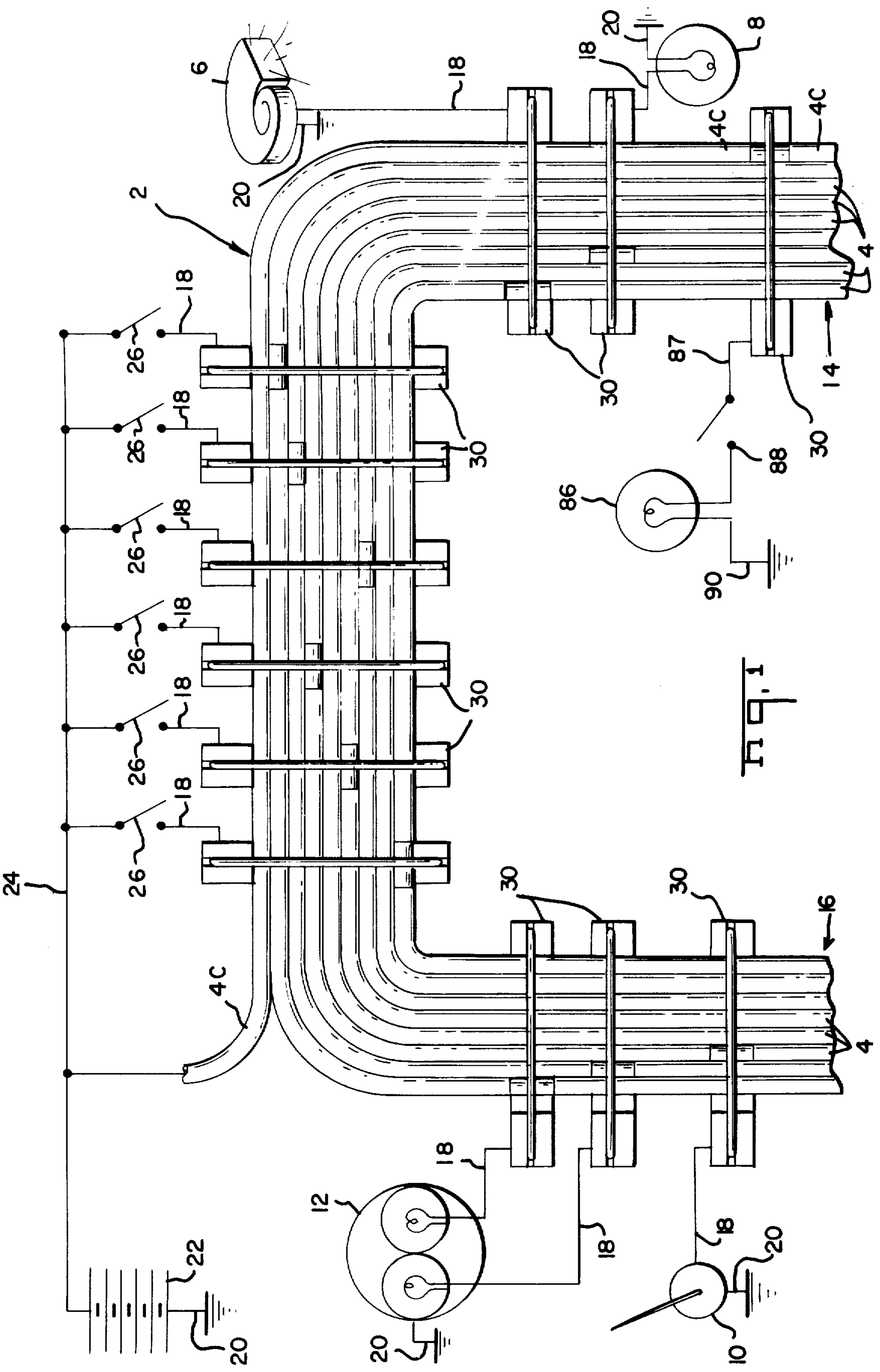
FIG. 1 is a semi-diagrammatic plan view of an electrical harness in accordance with the invention.

Referring first to FIG. 1, the disclosed form of harness comprises an electrical multi-conductor cable 2 made up of a plurality of insulated wires 4. It will be understood that the wires may be of the form of a ribbon cable which is a cable containing a plurality of wires in side-by-side co-planar relationship with the insulating sheath of each wire being integral with the insulating sheaths of adjacent wires. If the cable is composed of separate wires, as an alternative, the wires would be positioned in side-by-side co-planar relationship in the connecting device 30 described below.

A plurality of loads are selectively connected to the conductors 4 and these loads may comprise a horn 6, a windshield wiper 10, high and low beam headlights 12 and additional lights 8. The ends 14, 16 of the cable may extend to additional loads and the cable may have a number of conductors greater than that shown in the drawing. The individual loads are grounded as shown at 20 and are connected to the connecting devices 30 by leads 18.

Power is supplied to these circuits by a battery 22 from which a power cable 24 extends. The power cable is connected to a group of connecting devices 30 through individual switches 26 and electrical leads 18 which extend from the switches to the connecting devices 30.

Figure 2:
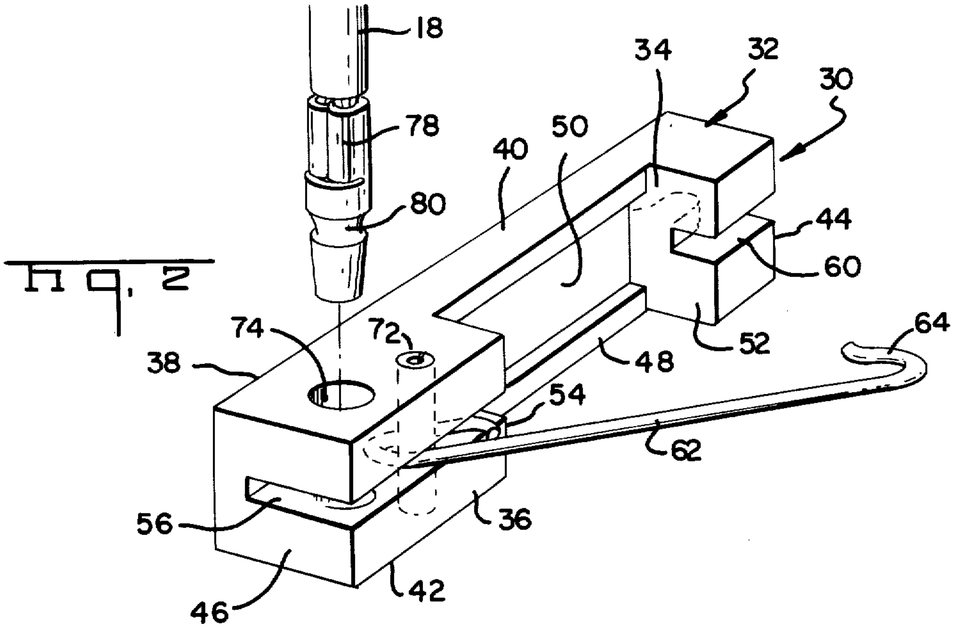
FIG. 2 is a perspective view of a connecting device used in the harness of FIG. 1.
Figure 3:
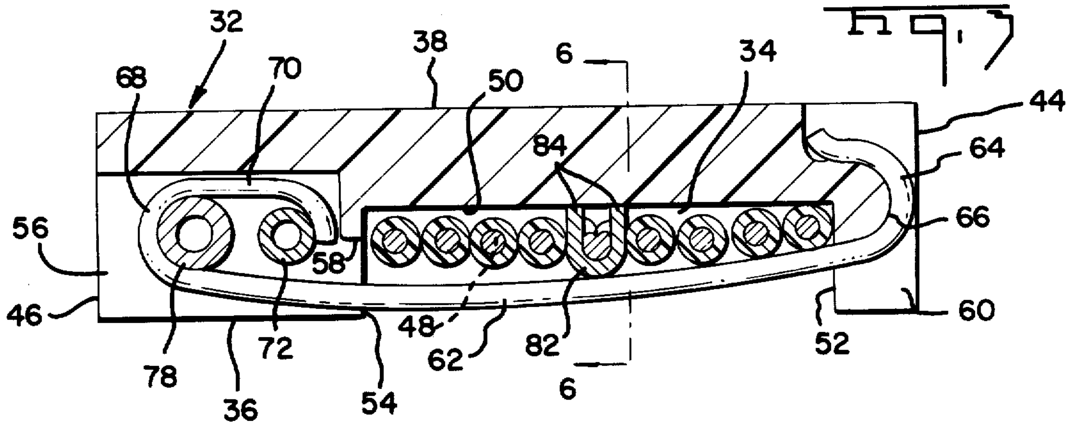
FIG. 3 is a cross-sectional view of a connecting device applied to the conductors in a harness.

The connecting devices 30 may be identical to each other and each connecting device comprises a generally prismatic body 32 (FIG. 2) of glass-filled nylon or other firm moldable insulating material. Body 32 has a cable receiving face 36, a back 38, sides 40, 42 and ends 44, 46. A cable receiving recess 34 extends into the face 36 and intersects the sides 40 , 42 of the body 32. The inner surface 48 of this recess serves as a cable supporting surface, and is further recessed as shown at 50 for reasons which will be explained below. The opposed sides 52, 54 of the recess are spaced apart by a distance which is substantially equal to the sum of the diameters of the wires 4, or by the width of the cable, so that the conductors can be placed in the recess in side-by-side relationship as shown in FIG. 3.

A slot 56 extends inwardly from the end 46 of the body and to the cable receiving recess 34 as shown at 58. A slot 60 extends into the end 44 and similarly intersects the side 52 of the recess 34. These slots accomodate the ends of the contact member or contact arm 62 in the form of a rod or heavy wire which has a reversely bent free end 64 and which extends across the cable receiving recess. The lefthand end of the contact member 62 is also reversely bent as shown at 68 and has an end portion 70 which extends rightwardly in FIG. 3 beyond a roll pin 72. The roll pin is located in an opening in the body 32 and extends from the side 40 to the side 42. The end portion 70 of the contact arm is formed in a manner such that contact arm is loosely pivoted in the slot 56 but cannot fall away from the body 32. The reverse bend 64 on the righthand end portion of the contact arm 62 has a curvature which conforms to a curved surface 66 in the slot 60.

A plug receiving opening 74 extends through the body from the side 40 to the side 42 adjacent to the roll pin 72 but relatively closer to the end 46 than is the roll pin. This opening is adapted to receive a plug member 78 which is crimped onto one of the wires 18. The plug member has a tapered leading end and a circumferentially extending recess 80 adjacent to its end. The opening 74 for the plug member is located such that when the plug member is inserted into the opening, the contact arm will be flexed and the reversely bend end 64 pulled tightly against the surface 66 of the slot 60.

Figure 6:
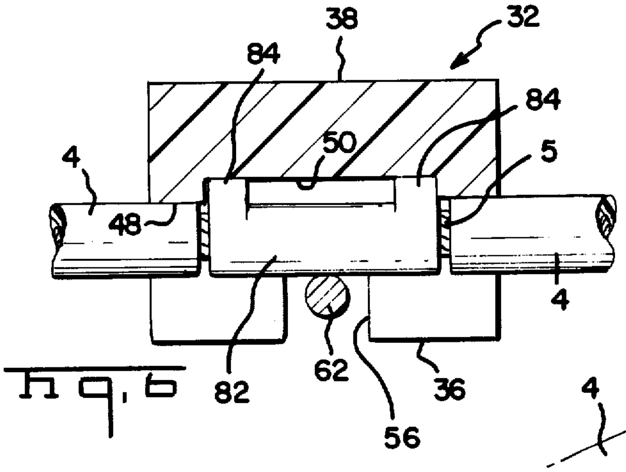
FIG. 6 is a view taken along the lines 6—6 of FIG. 3.
Figure 4:
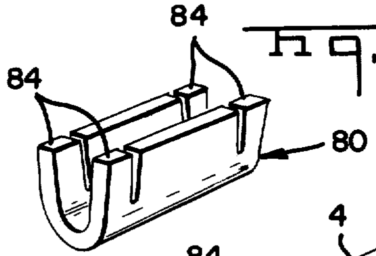
FIG. 4 is a perspective view of a ferrule used in the practice of the invention.
Figure 5:
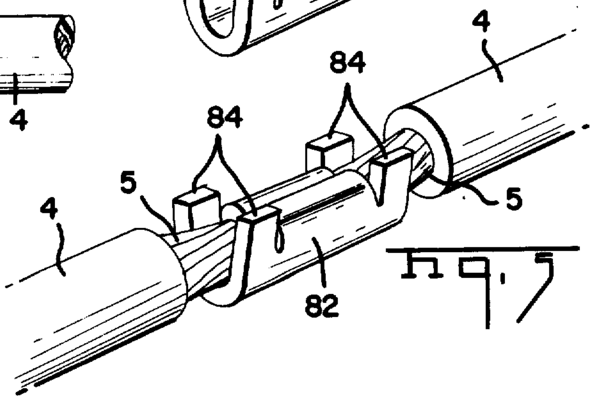
FIG. 5 is a perspective view of a ferrule crimped onto an intermediate portion of a wire.

When it is desired to form an electrical connection to a predetermined conductor 4 in the cable, a portion of the conductor is electrically exposed by stripping insulation from the conductor and crimping a ferrule 80 onto the metallic core of the wire. The U-shaped ferrule is crimped only in its center portions as shown at 82 so that four separate legs 84 are provided at the ends of the ferrule. The wires of a cable are then positioned in the recess 34 with the legs 84 of the ferrule against the depressed center portion 50 of the recess as shown in FIG. 6. The contact arm is then swung inwardly and snapped over the contoured surface 66 of the slot 60. The electrical connection of the conductor which has been electrically exposed to one of the conductors 18 is then effected by simply inserting the plug 78 into the opening 74 until the reversely bent portion 68 of the contact member 62 snaps into the circumferential recess 80 of the plug. As previously mentioned, the parts are advantageously dimensioned such that the contact member will be flexed and/or tensioned when the plug is inserted so that good contact pressure will be obtained at the point of contact between the surface of the ferrule and the contact arm. It should also be mentioned that during such flexure and/or tensioning of the contact arm, there will be relative movement of the surface of the contact arm over the surface of the ferrule and this relative movement of the two parts will have the effect of scouring the contact surfaces so as to ensure a good electrical connection. It is preferable to form the opening 74 such that the plug can be inserted from either side 40 or 42 of the housing.

Figure 7:
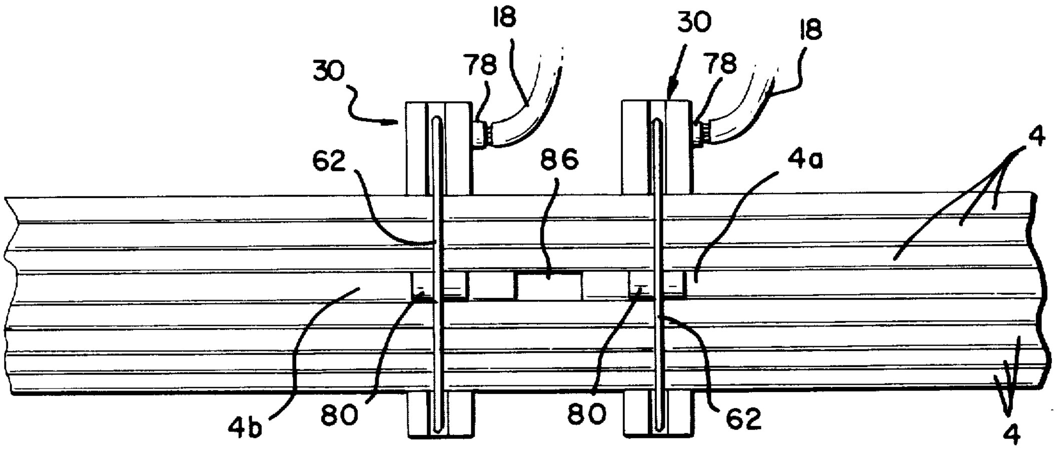
FIG. 7 is a fragmentary plan view illustrating the manner in which two connecting devices can be applied to a single conductor in a cable for different electrical circuits.

If the conductors are in the form of a flat cable having their insulating sheaths integral, one of the conductors can be used for two circuits as shown in FIG. 7 by simply removing a portion of the conductor as shown in 86 and applying ferrules 80 adjacent to the gap which remains after removal of the portion of the conductor. Connecting devices 30 can then be assembled to the cable on each side of the gap and the rightwardly extending portion **4*a* of the conductor can be used for one circuit while the leftwardly extending portion 4*b*** of the conductor can be used for a different circuit.

Under many circumstances, it is desirable to provide at least one "hot" conductor in the cable in order that isolated lights or other devices can be connected to this conductor. In FIG. 1, one conductor **4*c* is connected directly to the power distribution conductor 24 rather than being connected through a switch to the power distribution conductor as are the other branch conductors in the harness. If it is desired to provide, for example, a courtesy light 86 adjacent to one of the doors of the vehicle, the energized conductor 4*c* is tapped by a connecting device 30 and a connection is made as shown at 87 between the connecting device and a switch 88. The conductor extending from the switch is connected to the courtesy light 86 and a suitable ground connection is provided as shown at 90. The switch 88 would be a conventional normally open push button switch which would be held in closed condition by the vehicle door when the door is closed. The provision of an energized conductor 4*c*** thus permits the installation of lights of this type at any desired location adjacent to the cable.

Figure 8:
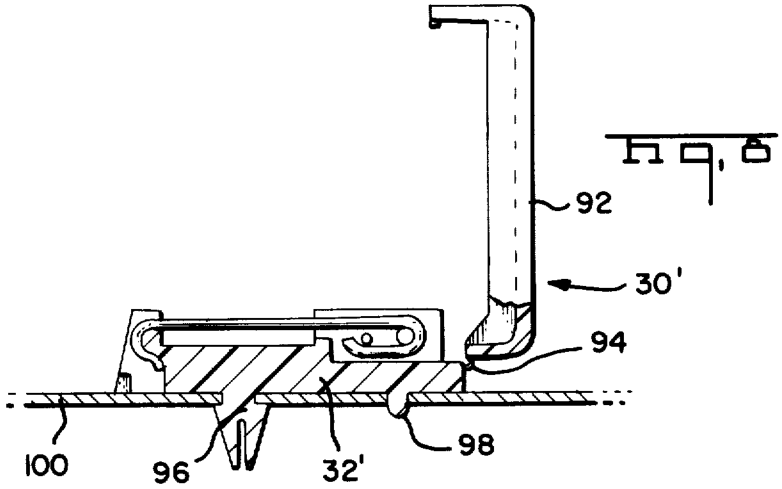
FIG. 8 is a cross-sectional view of a connecting device having an integral fastener.

FIG. 8 shows a modified form of connecting device 30' which is generally similar to the previously described embodiment but which also has an integral cover 92 hinged at 94 to the body member 32'. After the connecting device has been installed on the cable, the cover 92 is closed for purposes of protection and, if desired, sealing. Connecting device 30' also has an integral fastener 96 and a positioning boss 98 extending from its body portion 32' so that it can be attached to panel 100 if desired.

FIG. 1 shows the wires 4 of the cable as being in side-by-side co-planar relationship in all portions of the cable including those portions which extend between the connecting devices 30. If the wires 4 are separate wires rather than the conductors in a ribbon cable, the wires may be bunched together in those portions of the harness to which connecting devices are not applied, for example, the portion of the harness which extends from the windshield wiper 10 to the hazard lights 8 in FIG. 1. When the connecting device 30 for the windshield wiper or the hazard lights is applied to the cable, it is merely necessary to flaten the bunched wires and position them in the connecting device 30 as shown in FIG. 3. It should be noted in this respect that the wire to which a contact is being established by a particular connecting device 30 need not be located at any particular position in the cable; in other words, the wire for the ferrule thereon in FIG. 3 could be positioned anywhere between the sidewalls 52, 54 and contact would be established upon assembling the connecting device to the cable.

While the disclosed embodiment shows only a single type of connecting device having one contact arm member 62, it might be feasible under some circumstances to provide connecting devices having several arm members 62 pivotally mounted thereon in side-by-side spaced apart relationship. If a multi-contact connecting device of this type is used, the opening 74 for the plug member 78 would be relocated and the end 68 of the contact member changed so that it would contact the plug 78 upon insertion thereof.

The term "electrically exposed" is used herein to describe the conductor to which a connection is made and the conductor is exposed by stripping the insulation from the wire and crimping the ferrule 80 onto the wire. It will be apparent that other methods might be used to electrically expose the wire to which a connection is to be made. For example, a U-shaped ferrule having suitable insulating piercing means extending from its web might be employed. Upon application of such a ferrule to the wire without crimping, the insulation of the wire will be penetrated and contact established with the conducting core. The contact member 62 would contact the ferrule as described above.

A salient advantage of the invention is that only one type of connecting device 30 is required for the many electrical connections of the loads and the switches to the conductors in the cable. From a manufacturing method standpoint, the invention is advantageous in that the harness can be produced by simply applying ferrules 80 to the conductors at the appropriate locations for the electrical loads and the electrical switches. At the time of assembly of the harness to the vehicle, a connecting devices can be snapped onto the cable at each location where a connection is required and the associated lead wires 18 can be connected to the conductor by simply inserting the plug members 78 into the openings 74 of the connecting devices.

What is claimed is:

1. An electrical connecting device for establishing an electrical connection with an insulated wire, said wire being in a cable having a plurality of wires, said connecting device comprising:

an insulating body member, said body member having supporting surface portions for supporting said wires in side-by-side relationship, a contact spring member of conductive metal, said contact member extending transversely across said surface portions, at least one end of said contact member being releasably held on said body member whereby said contact member can be moved away from said body member, whereby, upon electrically exposing a portion of said wire, positioning said cable on said supporting surface portions, and securing said contact member to said body member, said contact member will engage the electrically exposed portion of said wire and establish electrical contact therewith.

2. A connecting device as set forth in claim 1, said body member comprising a generally prismatic block having a recess extending into one surface thereof between the ends of said block, said recess having an inner end, said inner end constituting said supporting surface portions.

3. A connecting device as set forth in claim 2, said recess having opposed parallel sides which extend inwardly from said one surface, said sides being spaced-apart by a distance equal to the sum of the diameters of said wires whereby said wires fit snugly in said recess in side-by-side parallel relationship.

4. A connection device as set forth in claim 3, said contact spring member comprising a contact arm, one end of said arm having a loose pivotal connection with said body member on one side of said recess, and cooperating means on the other end of said arm on said body member for latching said arm to said body member, said cooperating means constituting releasable holding means.

5. A connecting device as set forth in claim 4, said body member having a receptacle for reception of an electrical plug member which is secured to a further conductor, said one end of said contact arm being engageable with said plug member whereby said wire is electrically connected to said further conductor.

6. An electrical connecting device for establishing an electrical connection with an insulated conductor, said conductor being in a cable having a plurality of conductors, said connecting device comprising:

an insulating body member, said body member having supporting surface portions for supporting said conductors in side-by-side parallel co-planar relationship, a contact spring member of conductive metal, said contact member extending transversely across said supporting surface portions, releasable holding means for releasably holding at least one end of said spring contact member on said body member so that said contact member can be moved away from said body member, and lead wire connecting means for electrically connecting a lead wire to said contact spring member whereby, upon electrically exposing a portion of said conductor, positioning said conductors on said supporting surface portions in side-by-side co-planar relationship with the electrically exposed portions on said supporting surface portions, and securing said contact member to said body member, said contact member will engage the electrically exposed portion of said conductor and establish electrical contact therewith, and upon connecting said lead wire to said contact spring member, said lead wire is connected to said conductor.

7. A connecting device as set forth in claim 6, said lead wire connecting means comprising a receptacle in said body member for reception of a terminal on said lead wire.

8. In an electrical harness of the type comprising a plurality of insulated conductors, a plurality of electrical loads, a plurality of switches, and a power source, each of said loads being connected to a predetermined one of said conductors by a load conductor and each of said switches being connected to said power source and to a predetermined one of said conductors by a tap conductor whereby said loads can be energized by closing said switches, the improvement comprising:

said switches and said loads being connected to said conductors by substantially identical connecting devices, each of said connecting devices comprising an insulating body member, said body member having conductor supporting surface portions, said conductors being supported on said conductor supporting surface portions in side-by-side parallel relationship, said conductors having electrically exposed portions which are selectively located adjacent to said conductor supporting surface portions of said connecting devices, a metallic contact member on each of said body members, each of said contact members extending transversely across its associated body member with said conductors between said contact members and said supporting surface portions, each of said contact members being in electrical contact with one of said electrically exposed portions of one of said conductors, and said load conductors and said tap conductors being selectively connected to said contact members whereby said loads are selectively connected through said switches to said power source.

9. An electrical harness as set forth in claim 8, said conductors comprising wires, said contact members comprising spring members.

10. An electrical harness as set forth in claim 9 each of said spring members being pivotally mounted on its associated body member at one end thereof, latch means for latching the other end of each spring member to its associated body member whereby, said spring member can be arcuately moved away from said conductor supporting surface portions to permit installation and removal of said connecting device on and from said conductors.

11. An electrical harness as set forth in claim 10, said load conductors and said tap conductors having terminals thereon, said terminals being disengageably connected to said connecting devices and being in electrical contact with said spring members.

12. An electrical harness as set forth in claim 8, said insulated conductors comprising wires contained in a flat cable, at least one of said wires having a short portion removed therefrom at a predetermined location, a switch and a load connected to said one conductor on each side of said predetermined location whereby said one wire in said cable extends to two separate loads.

13. The method of providing an electrical wiring harness on a apparatus having functional electrical devices at different locations thereon, said method comprising the steps of:

providing a cable having a member of insulated conductors which is sufficient for said electrical devices and having a length which is sufficient to extend to said devices, electrically exposing short portions of said conductors at locations along the length of said cable which correspond to the locations of said devices on said apparatus, assembling said cable to said apparatus so that the electrically exposed portions of said cable are proximate to said electrical devices, assembling to said cable at said locations connecting devices which contact said electrically exposed portions of said conductors, and connecting said electrical devices to said connecting devices.

14. The method as set forth in claim 13, some of said electrical devices comprising electrical switches, others of said electrical devices comprising electrical loads, said method including the repetitive steps of a connecting predetermined switches and predetermined loads to the same electrical conductor by the use of said connecting devices.

* * * * *